United States Patent [19]

Tanaka

[11] Patent Number: 5,550,987
[45] Date of Patent: Aug. 27, 1996

[54] DATA TRANSFER DEVICE

[75] Inventor: Koichi Tanaka, Kanagawa-ken, Japan

[73] Assignee: Kabushiki Kaisha Toshiba, Kawasaki, Japan

[21] Appl. No.: 97,219

[22] Filed: Jul. 27, 1993

[30] Foreign Application Priority Data

Jul. 28, 1992 [JP] Japan .................................. 4-201392

[51] Int. Cl.⁶ .................................................. G06F 13/38
[52] U.S. Cl. ............................................ 395/286; 395/280
[58] Field of Search .................................... 395/325, 425, 395/775, 550, 500, 275

[56] References Cited

U.S. PATENT DOCUMENTS

| | | | |
|---|---|---|---|
| 3,226,693 | 12/1965 | Dumey | 395/550 |
| 4,837,571 | 6/1989 | Lutz | 341/67 |
| 4,959,779 | 9/1990 | Weber et al. | 395/775 |
| 5,243,699 | 9/1993 | Nickolls et al. | 395/275 |
| 5,251,312 | 10/1993 | Sodos | 395/425 |
| 5,265,259 | 11/1993 | Satou et al. | 395/325 |
| 5,341,508 | 8/1994 | Keeley et al. | 395/325 |
| 5,398,328 | 3/1995 | Weber et al. | 395/425 |
| 5,410,677 | 4/1995 | Roskowski et al. | 395/500 |

FOREIGN PATENT DOCUMENTS

| | | |
|---|---|---|
| 63-263524 | 10/1988 | Japan . |
| 2-141857 | 5/1990 | Japan . |
| 3-160550 | 7/1991 | Japan . |

*Primary Examiner*—Jack B. Harvey
*Assistant Examiner*—David A. Wiley
*Attorney, Agent, or Firm*—Foley & Lardner

[57] ABSTRACT

A data transfer device has a input circuit for receiving a data block of a data structure including data elements of different lengths in each set data length from a transfer source, a converter for assembling data received by the input circuit into data elements and converting the structure of the assembled data elements to endian format for a memory, an output circuit for providing to a memory, data elements which have been structurally converted by the converter for each set data length. The device further has a first register for storing a data structure for transmitted data blocks, a second register for storing transfer source endians and transfer destination endians, and a controller for controlling the assembly process for the converter according to the data structure stored in the first register, for controlling the conversion process for the converter according to endian formats stored in the second register, and for controlling the input and output of data for the input circuit and for the output circuit.

28 Claims, 10 Drawing Sheets

00: 1 BYTE LENGTH DATA

01: 2 BYTE LENGTH DATA

10: 4 BYTE LENGTH DATA

11: RESERVED

FIG.4A
INPUT SIDE

BYTE ADDRESS | 1 BYTE
--- | ---
$1000 | BB } 2 BYTE LENGTH DATA
+1 | AA
+2 | 33 } 4 BYTE LENGTH DATA
+3 | 22
+4 | 11
+5 | 00
+6 | CD } 1 BYTE LENGTH DATA
+7 | EF } 1 BYTE LENGTH DATA

BYTE ADDRESS REPRESENTATION (LITTLE ENDIAN)

FIG.4C
OUTPUT SIDE

BYTE ADDRESS | 1 BYTE
--- | ---
$2000 | AA } 2 BYTE LENGTH DATA
+1 | BB
+2 | 00 } 4 BYTE LENGTH DATA
+3 | 11
+4 | 22
+5 | 33
+6 | CD } 1 BYTE LENGTH DATA
+7 | EF } 1 BYTE LENGTH DATA

BYTE ADDRESS REPRESENTATION (BIG ENDIAN)

FIG.4B

ADDRESS | ODD ADDRESS | EVEN ADDRESS
--- | --- | ---
$1000 | AA | BB } 2 BYTE LENGTH DATA
+2 | 22 | 33 } 4 BYTE LENGTH DATA
+4 | 00 | 11
+6 | EF | CD } 1 BYTE LENGTH DATA

2 BYTE WIDTH DATA BUS REPRESENTATION (LITTLE ENDIAN)

FIG.4D

ADDRESS | ODD ADDRESS | EVEN ADDRESS
--- | --- | ---
$2000 | BB | AA
+2 | 11 | 00
+4 | 33 | 22
+6 | EF | CD

2 BYTE WIDTH DATA BUS REPRESENTATION (BIG ENDIAN)

FIG.4E

DATA STRUCTURE VALUE

|ADDRESS|ODD ADDRESS|EVEN ADDRESS| |
|---|---|---|---|
|$1000|0A|A5|} DATA STRUCTURE VALUE|
|+2|AA|BB|} 2 BYTE LENGTH DATA|
|+4|22|33|} 4 BYTE LENGTH DATA|
|+6|00|11| |
|+8|EF|CD|} 1 BYTE LENGTH DATA|

2 BYTE WIDTH DATA BUS REPRESENTATION (LITTLE ENDIAN)

FIG.6B

|ADDRESS|ODD ADDRESS|EVEN ADDRESS|
|---|---|---|
|$2000|A5|0A|
|+2|BB|AA|
|+4|11|00|
|+6|33|22|
|+8|EF|CD|

2 BYTE WIDTH DATA BUS REPRESENTATION (BIG ENDIAN)

DATA TRANSFER DEVICE

TECHNICAL FIELD

The present invention relates to a data transfer device for transferring data mainly between memories or between a memory and a data processing device, and, in particular, to a data transfer device for converting byte order of data blocks formed from data elements of different lengths based on this data structure and for transferring the converted data blocks.

BACKGROUND ART

There are some data representation method to store a multi-byte data in a byte addressable memory.

Some types of CPU utilize the little endian method in which low order byte is positioned at the low end of an address, and high order byte is positioned at the high end of an address when storing data of a two-byte length or greater in memory, and the big endian method, which is the reverse. An address in byte units is provided for the data stored in the memory in many cases.

Figure 1A:
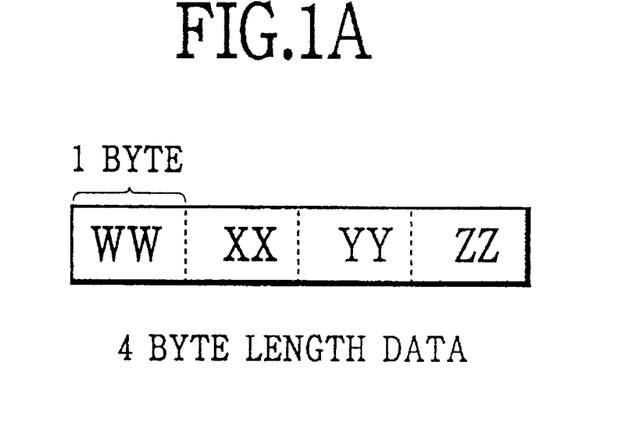
FIG. 1A is a diagram showing a byte list for 4-byte length data in numerical format.
Figure 1B:
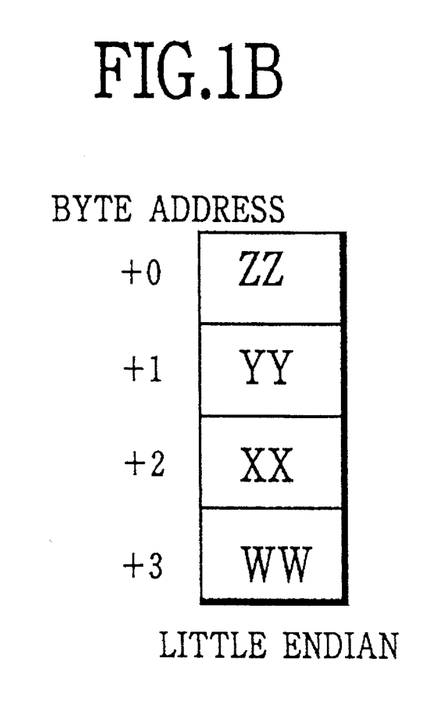
FIG. 1B is a diagram showing a byte list for 4-byte length data being stored in memory based on the little endian method before data transfer.
Figure 1C:
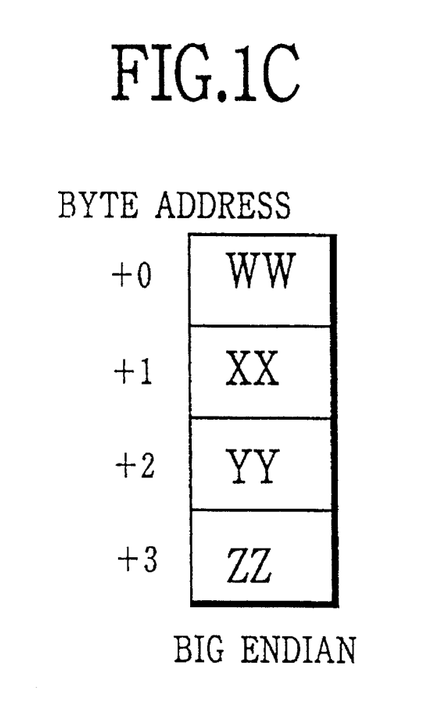
FIG. 1C is a diagram showing a byte list for 4-byte length data being stored in memory based on the big endian method after data transfer.

Therefore data of a four-byte length as shown in FIG. 1A, for example, when written into memory as $WWXXYYZZ (where each alphabetic character indicates one digit in hexadecimal), is arranged in little endian as shown in FIG. 1B, and in big endian as shown in FIG. 1C. However, because there is a difference in arrangement in the memory, when two CPUs with different endians exchange data via memory, erroneous data is, of course, transferred.

In particular, in the exchange of control data between a peripheral device and the CPU, it frequently happens that data units of various lengths are made into elements, and data blocks formed from a plurality of data elements are used.

Major problems arise because the arrangements differ according to the length of the data element. For example, if the data length is restricted to two bytes and the width of the data bus is two bytes, the data bus may be divided into two signal line groups of one-byte width and wired so that the low order bytes and the high order bytes are exchanged.

In the case where one-byte length data and four-byte length data units are included, it is clear that transfer cannot be carried out in the correct data sequence. For this reason, in many CPUs the sequence of the data bytes in memory is changed by means of a program. For this reason, an excess of processing time is used in data exchange between peripheral devices, and many problems occur in the interfacing of peripheral devices and CPUs.

Accordingly, there have conventionally been many proposals covering technology for sequencing transferred data.

For example, in an "Endian conversion method" disclosed in Japanese Laid Open Patent Application No. 3-160550 the endian formats for a local processor and a main processor differ, so in the case where data is transferred between the two processors via a common memory, a data swap control section to exchange byte order and a register for storing swap information for word size data are provided between the main processor and the common memory. When data to be swapped is transferred the swap is executed by the data swap control section from a swap instruction set in the register.

In transferring data between the two processors using this conventional technology, the main processor orders a swap operation for communication data with homogeneous data size to ascertain whether or not word data is to be swapped, and the swap operation isn't ordered so that parameter data including various types of data is not swapped.

Specifically, one type of swap exchange is made for data transferred continuously in large volume. However, in this type of technology, when a data structure is transferred which is made up of various data sizes in which byte data, word data, and long word data is mixed, if a swap is made the main processor must issue the swap operation for each individual data unit in turn so that it is impossible to execute high speed data transfer operation.

In addition, in a "Data processing system" disclosed in Japanese Laid Open Patent Application No. 2-141857, a data structure conversion means provided in an interface section for the common bus and the data processing devices and a control register for controlling the method of conversion in a program are provided in a data processing system comprising a plurality of data processing devices linked by a common bus, and the data arrangement structure is sequenced between the data processing devices and the common bus so that processing time is shortened.

However, the data transferred in this system is homogeneous data and there is no indication of the transfer of a mixture of various sizes of data units.

Specifically, the data set in a control register shown in FIG. 1 of the above-mentioned publication is one bit of data, "0" or "1", and is not formed from a plurality of bits. Accordingly, if various sizes of data units are mixed, a plurality of bits is required. This system, therefore, is not capable of transferring a data structure which is made up of a mixture of data units of various sizes.

Also, in a "Data structure conversion method" disclosed in Japanese Laid Open Patent Application No. 63-263524, a data structure conversion device is provided between an external memory device and a main memory device. When data is transferred, the data structure for each data transfer unit is changed in response to a data structure conversion request, and the transfer is then performed.

In this method, a structural conversion is performed by moving data in a record to an indicated address, and a data base vector process is simplified by changing the line up in a predetermined address. However, it is not possible to transfer correctly structured data which includes data elements of various lengths.

As explained above, in a conventional data transfer device which performs data transfer between devices using different endian formats, it is possible to change the structure of data blocks made up of data elements of a uniform length and transfer these data blocks, but it is not possible to change the structure and transfer data blocks which include data elements of various lengths.

Furthermore, when the data is transferred, the structure is changed using a program, or the structure is changed according to an instruction given to each data element in turn, therefore considerable processing time is required to perform such changes so that high speed data transfer becomes a problem.

SUMMARY OF THE INVENTION

Accordingly, an object of the present invention is to provide, with due consideration to the drawbacks of such conventional data transfer devices, a data transfer device wherein it is possible to convert the endians of data blocks made up of data elements of various lengths and transfer these blocks instead of conversion by a program so that high speed data transfer is achieved between devices using different endian formats.

In a preferred embodiment of the present invention, a data transfer device includes:

input means for receiving a data block of a data structure including a plurality of data elements of different lengths according to each data length from a transfer source;

conversion means for assembling data received by said input means into data elements and converting the structure of the assembled data elements to endian format for a transfer destination;

output means for providing to a transfer destination, data elements which have been structurally converted by said conversion means for each data length;

first memory means for storing a data structure for transmitting data blocks;

second memory means for storing transfer source endians and transfer destination endians; and control means for controlling the assembly process for said conversion means according to the data structure stored in said first memory means, for controlling the conversion process for said conversion means according to an endian format stored in said second memory means, and for controlling the input and output of data for said input means and for said output means.

In the preferred embodiment of the present invention described above, in the data transfer device said conversion means includes:

byte order conversion means for arranging a byte order of n-byte length (n≧2) data elements in reverse; and selection means for selecting data elements arranged by said byte order conversion means, or assembled data elements received by said input means.

In the preferred embodiment of the present invention described above, in the data transfer device, said conversion means further includes:

a byte exchange circuit for switching the placement of one high order byte of a data element to the low order side while switching the placement of one low order byte of a data element to the high order side for a data element of two-byte length;

a word exchange circuit for switching the placement of one high order byte of a data element to the low order side while switching the placement of one low order byte of a data element to the high order side for two high order bytes of a data element in a data element of four-byte length, and for switching the placement of one high order byte of a data element to the low order side while switching the placement of one low order byte of a data element to the high order side for two low order bytes of a data element in a data element of four-byte length; and selection means for selecting the output of an assembled data element received from the input means in the case where the data element is structurally converted;

for selecting the output of a placement-switched data element by means of the byte exchange circuit in the case where a two-byte length data element is structurally converted; and for selecting the output of two high order bytes of a data element following the selection of the output of two low order bytes of a data element in a placement-switched four-byte length data element by means of the word exchange circuit, in the case where a four-byte length data element is structurally converted.

In the preferred embodiment of the present invention described above, in said first memory means, a stored data structure designates the byte length of a data element assembled by said conversion means.

In the preferred embodiment of the present invention described above, a stored data structure is set in said first memory means by a processor.

In the preferred embodiment of the present invention described above, a stored data structure is set in said first memory means by a data element received from said input means.

In the preferred embodiment of the present invention described above, said transfer source and said transfer destination is a memory or a processor.

In another preferred embodiment of the present invention, a data transfer device includes:

first and second input means for receiving a data block of a data structure including a plurality of data elements of different lengths in each data length from first and second data storage means;

conversion means for assembling data received by said first and second input means into data elements and converting the structure of the assembled data elements to endian format for said first and second data storage means;

first and second output means for providing to said first and second data storage means, data elements which have been structurally converted by said conversion means for each assigned data length;

first memory means for storing data structure for transmitting data blocks;

second memory means for storing transfer source endians and transfer destination endians; and control means for controlling the assembly process for said conversion means according to the data structure stored in said first memory means, for controlling the conversion process for said conversion means according to an endian format stored in said second memory means, and for controlling the input and output of data for said first and second input means and for said first and second output means, wherein when said first data storage means is a transfer source, said second data storage means becomes a destination source, and when said second storage means is a transfer source, said first storage means becomes a destination source.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Before describing preferred embodiments, we make a situation in which hexadecimal numbers are arranged in memory addresses by which datum are stored in order to explain the difference between the little endian form and the big endian form. In the situation, low order address is placed in the right side of a number and the high order address at the left side of a number.

An embodiment of a data transfer device of the present invention will now be explained with reference to the drawings.

Figure 2:
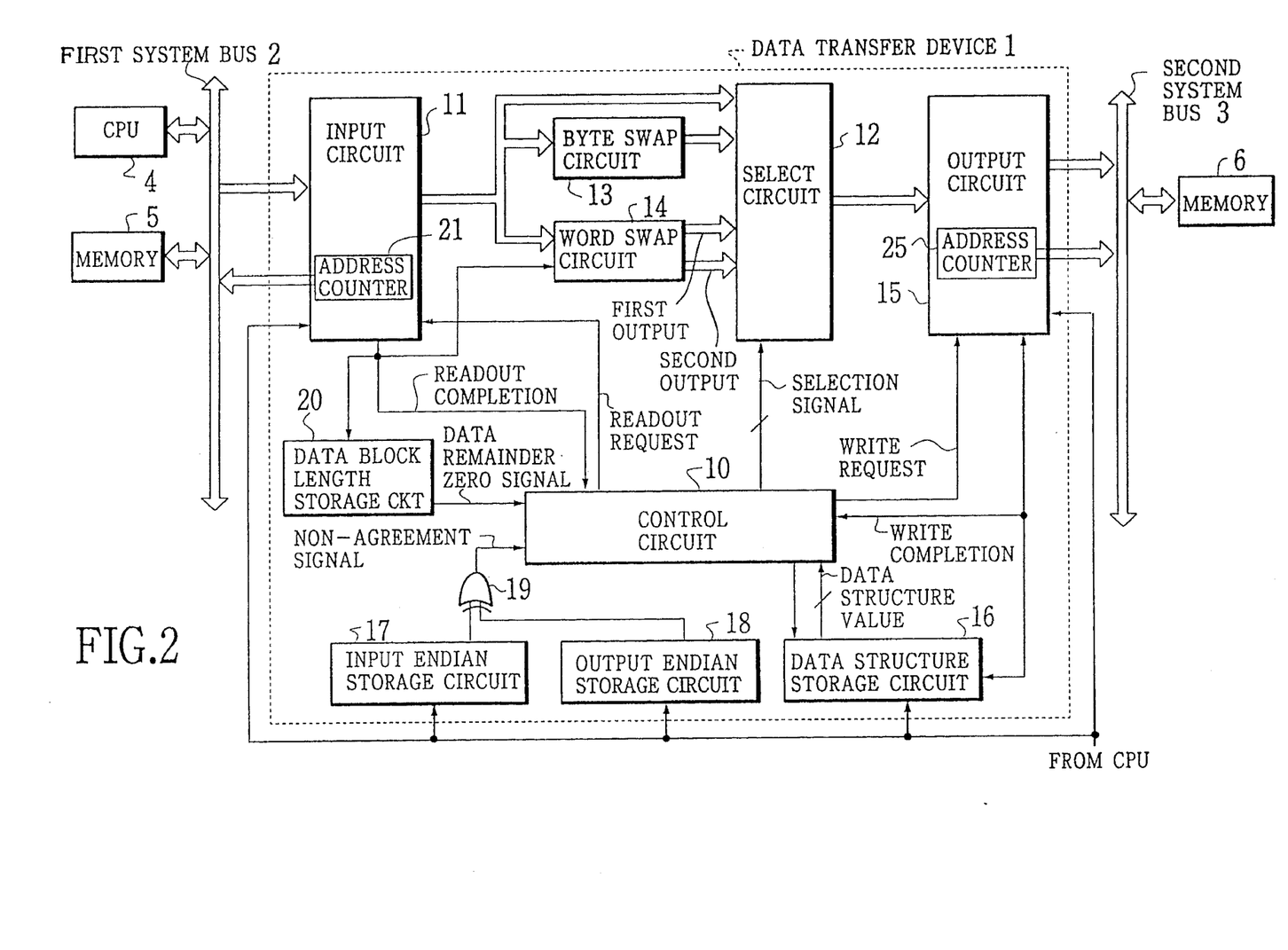
FIG. 2 is a configuration diagram illustrating a first embodiment of a data transfer device of the present invention.

FIG. 2 is a configuration diagram illustrating a first embodiment of a data transfer device of the present invention.

In this embodiment, as outlined below, the data width for a first system bus and for a second system bus is two bytes. In addition, three types of data are handled, specifically, data of one-byte, two-byte, and four-byte lengths. Data on the first system bus 2 is different from data on the second system bus 3 in the endian format.

In FIG. 2, a control circuit 10 of a data transfer device 1 generates signals for controlling an input circuit 11, a select circuit 12, an output circuit 15, and a data structure storage circuit 16. The input line to the input circuit 11 is connected to a first system bus 2.

An address counter for storing and updating an address for reading data from a memory 5 connected to the first system bus 2 is built into the input circuit 11. The output line from the input circuit 11 is connected to the selector circuit 12, a byte swap circuit 13, and a word swap circuit 14, respectively.

When the input circuit 11 receives a read request from the control circuit 10, the value in the address counter 21 in the input circuit 11 is output to the first system bus 2 and data read out of the memory 5 is input to the input circuit 11.

In addition, the address counter 21 in the input circuit 11 is incremented twice after reading out two bytes of data.

The selector circuit 12 has the function of receiving an instruction by means of a selection signal from the control circuit 10 and selecting one of outputs from the input circuit 11, from the byte swap circuit 13, and from the first and second outputs of the word swap circuit 14.

The byte swap circuit 13 converts the arrangement for a data element of a two-byte length provided from the input circuit 11 by switching one byte on the upper order side to the lower order side, and by switching one byte on the lower order side to the upper order side.

The word swap circuit 14 switches the arrangement of a first inputted data (CD). One byte of a data element (C) is switched from the upper order side to the lower order side, one byte of a data element (D) is switched from the lower order side to the upper order side, thus the arrangement of two bytes of a data element (CD) to (DC). Wherein, C and D are lower order side of a data element ABCD of a four-byte length made up of data elements A, B, C, and D each of a one-byte length.

In addition, the word swap circuit 14 switches the arrangement of a second inputted data (AB). One byte of a data element (A) on the upper order side is switched to the lower order side, one byte of a data element (B) on the lower order side is switched to the upper order side, thus the arrangement of two bytes of a data element (AB) to (BA) for two bytes of a data element (AB) on the upper order side in the same four-byte length data element ABCD. Thus the arrangement of a data element (ABCD) of a four-byte length switches to a data element (BADC) of a four-byte length.

Accordingly, both the selector circuit 12 and the byte swap circuit 13 together with the word swap circuit 14 function as means for converting the structure of data elements. When converting the structure of data elements, a data element received and assembled by the input circuit 11 is selected by the selector circuit 12 and output.

When converting the structure of a data element of a two-byte data length, the data element which is structurally converted by the byte swap circuit 13 is selected by the selector circuit 12 and output.

When converting the structure of a data element with a four-byte data length, at first, the upper order side of the data element (BA) of a two-byte length in the data element (BADC) of a four-byte length, which is structurally converted by the word swap circuit 14, is selected by the selector circuit 12 and output, then the lower order side of the data element (DC) of a two-byte length is selected and output.

As a result, the arrangement of a data element (ABCD) of a four-byte length becomes (DCBA), thus reversing the byte arrangement in a data element of a four-byte length.

The output circuit 15 is connected to the second system bus 3 and has a built-in address counter 25 for storing and updating an address for writing into a memory 6 connected to the second system bus 3.

The input line of the output circuit 15 is connected to the output line of the selector circuit 12. When the output circuit 15 receives a write request from the control circuit 10, the value in the address counter 25 and the data output by the selector circuit 12 are output to the second system bus 3 and written into the memory 6.

At the same time, the address counter 25 is incremented twice because two bytes are written. The data structure storage circuit 16 stores a value showing the structure of data transferred by the data transfer device 1. The size of the data input by the input circuit 11 is indicated to the control circuit 10.

An input endian storage circuit 17 and an output endian storage circuit 18 store values indicating endian values handled by the input circuit 11 and the output circuit 15.

An XOR gate 19 outputs a logical "0" when the values for the input endian storage circuit 17 and the output endian storage circuit 18 are in agreement, and outputs a logical "1" when these values differ, as an endian non-agreement signal. This signal is input to the control circuit 10. A data block length storage circuit 20 stores the remainder of the data blocks for transfer. The input circuit 11 reduces the remainder according to the number of data units input, and outputs a remainder zero signal to the control circuit 10 when the remainder becomes zero.

The respective contents of the address counter 21 of the input circuit 11, the address counter 25 of the output circuit 15, the data structure value of the data structure storage circuit 16, the input endian storage circuit 17, the output endian storage circuit 18, and the data block length storage circuit 20 are set by the CPU 4.

Figure 3:
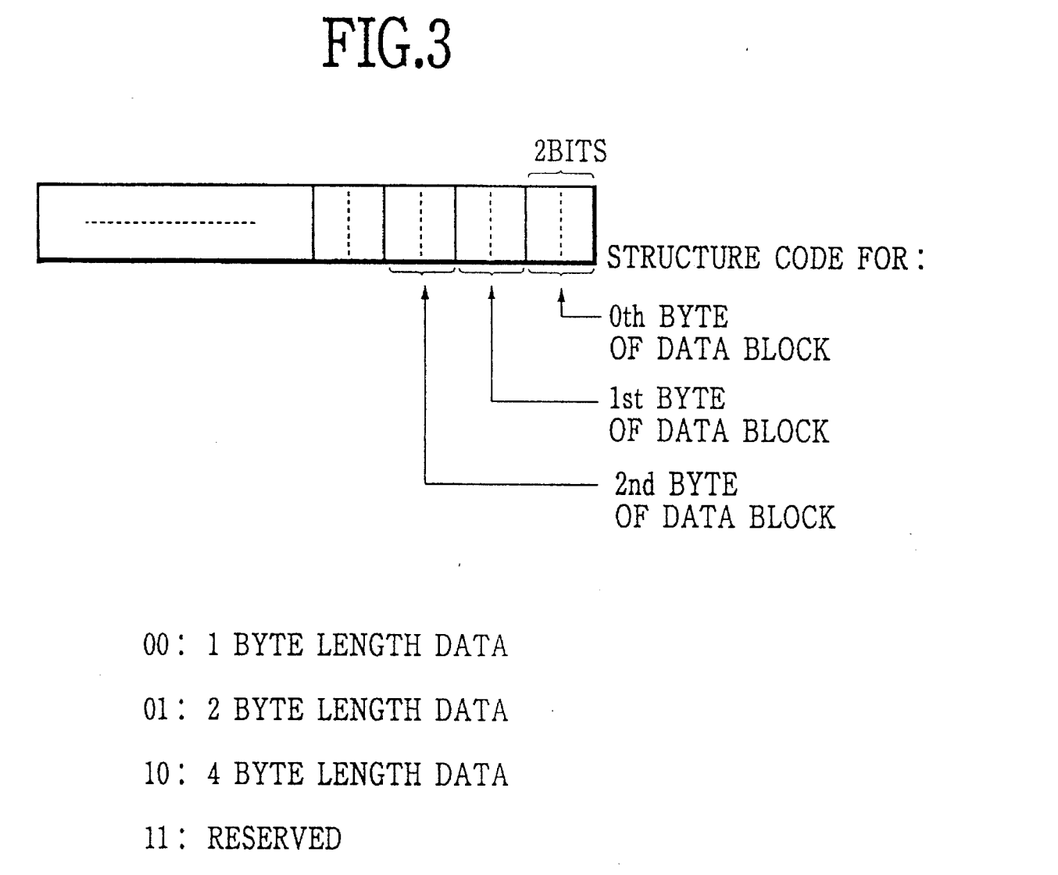
FIG. 3 is a diagram illustrating one embodiment of data structure control data used in the present invention.
Figure 4A:
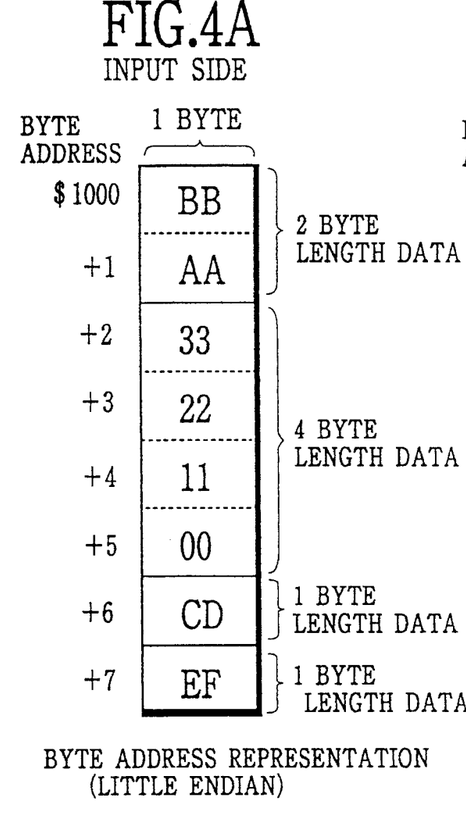
FIGS. 4A to 4E are diagrams showing one example of the data structure used in the first embodiment.

FIG. 3 is a diagram showing a configuration for control data which indicates the data structure. In FIG. 3, a field of two bits in the control data is allotted for each byte of transferred data, assigned from the lower order bit in transfer sequence. The value of these two bits is coded so that "00" indicates data of a one-byte length, "01" indicates data of a two-byte length, and "10" indicates data of a four-byte length. For example, the control data indicating the data structure illustrated in FIG. 4A is presented as "0000 1010 1010 0101" (in binary), as shown in FIG. 4E.

In this type of embodiment, prior to the data transfer, the CPU 4 first sets the respective initial values in the address counter of the input circuit 11, the address counter of the output circuit 15, the data structure value of the data structure storage circuit 16, the input endian storage circuit 17, the output endian storage circuit 18, and the data block length storage circuit 20.

To present an example, the set values are as indicated below. In addition, the structure of the transferred data block is shown in FIG.4A. The symbol "$" indicates hexadecimal, and "B" indicates binary.

Input address: $1000

Output address: $2000

Data structure value: B'0000101010100101'

Input endian: Little Endian

Output endian: Big Endian

Data length: 8 Bytes

The operation is explained below, following through the procedures.

The data structure storage circuit 16 outputs the lower order four bits (B'0101') of the data structure value for a two-byte portion corresponding to a first data reading. The control circuit 10 outputs an input request to the input circuit 11 because the data remainder is not zero. The input circuit 11 outputs the address $1000 to the first system bus 2 and reads data from the memory 5. This data is $AABB because $BB is read out from $1000 and $AA is read out from $1001. The address counter 21 of the input circuit 11 is incremented by a two-byte portion and becomes $1002. The XOR gate 19 outputs an endian non-agreement signal (=1) because the input endian and the output endian differ.

The control circuit 10 receives the data structure value (B'0101') and the endian non-agreement signal, comes to the decision that a swap of data of a two-byte length is necessary, and instructs the selector circuit 12 to select the output from the byte swap circuit 13. The value read out of the input circuit 11 is converted by the byte swap means and becomes $BBAA.

This is provided to the output circuit 15 from the selector circuit 12. When the control circuit 10 is advised of the completion of the read-out of the input circuit 11, it outputs a write request to the output circuit 15.

In addition, the data block length storage circuit 20 which is advised of the completion of the read-out is decremented by a two-byte portion and becomes "6". The output circuit 15 outputs the address $2000 and the data $BBAA to the second system bus 3 and writes them into the memory 6. Thus, $AA is stored in $2000 and $BB is stored in $2001.

On notification that the write-in by the output circuit 15 has been completed, the data structure storage circuit 16 outputs the next two-byte portion of the data structure value. In this example, B'1010' is output.

The control circuit 10 outputs an instruction to read the next data to the input circuit 11 because the data remainder is not zero. Data $2233 is read from an address $1002 through the first system bus 2. The read-out data ($2233) is input to the word swap circuit 14 because the data structure value is shown to be B'1010' which is data of a four-byte length. The control circuit 10 instructs the input circuit 11 to read the next two bytes. Data $0011 is read out from the address $1004 by the first system bus 2. The read-out data ($0011) is input to the word swap circuit 14. Under these conditions $00112233 is accumulated in the word swap circuit 14. The first output from the word swap circuit 14 is $1100, and the second output is $3322.

Next, the control circuit 10 instructs the selection circuit 12 to select the first output from the word swap circuit 14 and a write request is given to the output circuit 15. The output circuit 15 writes $1100 into an address $2002. The data structure storage circuit 16 is advised of the completion of the write-in, renews the data structure value, and outputs B'1010'.

The control circuit 10 further instructs the selection circuit 12 to select the second output from the word swap circuit 14 and a write request is given to the output circuit 15. The output circuit 15 writes $3322 into an address $2004. The data structure storage circuit 16 is advised of the completion of the write-in, updates the data structure value, and outputs B'0000' which is the next two-byte portion of the data structure.

Because the data remainder is 2, the control circuit 10 requests the input circuit 11 to input the next data. As a result, the input circuit 11 inputs data $EFCD in an address $1006. The data remainder thus becomes zero and the completion of the data transfer is advised to the control circuit 10.

The control circuit 10 concludes that data of a one-byte length has been entered since the data structure value is B'0000'. Because it is not necessary to convert data of a one-byte length, the selector circuit 12 is instructed to select the value of the input circuit 11, and the selector circuit 12 provides $EFCD to the output circuit 15. Next, the control circuit 10 makes a write request to the output circuit 15. The output circuit 15 writes the data $EFCD in an address $2006. The control circuit 10 waits for the completion of the action of the output circuit 15 and reports the CPU 4 of the completion of the data transfer.

By means of the above procedure, as shown in FIG. 3, one unit of data of a two-byte length, one unit of data of a four-byte length, and two units of data of a one-byte length are transmitted. The data arrangement in memories 5 and 6 is shown in FIGS. 4A to 4E.

Figure 4B:
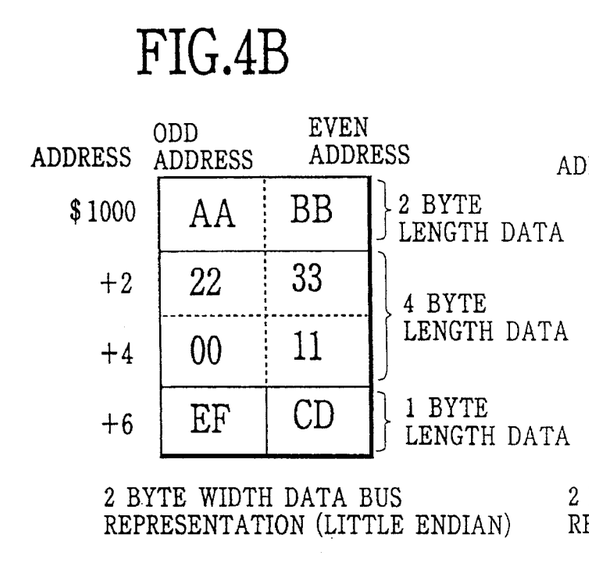
Figure 4C:
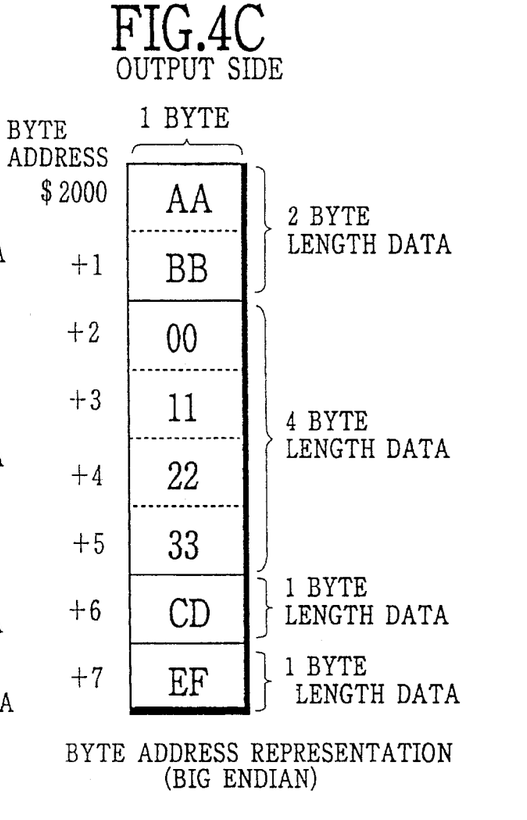

FIG. 4A shows data arranged to conform to the input side endian format, and FIG. 4B shows data transmitted to the output side. As clearly shown in FIG. 4A, FIG. 4B has an arrangement suitable for output side endian format.

Next, an operation will be explained, following through the procedures, for the case where the input side endian and the output side endian are the same.

Input address: $1000

Output address: $2000

Data structure value: B'0000101010100101'

Input endian: Little Endian

Output endian: Little Endian

Data length: 8 bytes

The data structure storage circuit 16 outputs the lower order four bits (B'0101') of the data structure value for a two-byte portion corresponding to the first data reading. The control circuit 10 outputs an input request to the input circuit 11 since the data remainder is not zero. The input circuit 11 outputs the address $1000 to the first system bus 2 and reads data from the memory 5. This data is $AABB.

The address counter 21 of the input circuit 11 is incremented by a two-byte portion and becomes $1002. The XOR gate 19 does not output an endian non-agreement signal because the input endian and the output endian are the same. Therefore, the control circuit 10 concludes that a structural change is unnecessary, because the data structure value is B'0101' and the endian non-agreement signal is not input, and instructs the selector circuit 12 to select the value in the input circuit 11. The selector circuit 12 provides $AABB to the output circuit 15. The control circuit 10 on being advised of the completion of the read-out of the input circuit 11 outputs a write request to the output circuit 15.

In addition, the data block length storage circuit 20 is advised of the completion of the read-out and is decremented by a two-byte portion to become "6". The output circuit 15 outputs the address $2000 and the data $AABB to the second system bus 3 and writes these outputs into the memory 6. On notification that the write-in by the output circuit 15 has been completed, the data structure storage circuit 16 outputs the next two-byte portion of the data structure value. In this example, B'1010' is output. The above operation is repeated until the remainder of the data block length becomes zero. Specifically, when the I/O endians are the same a data structure conversion is not performed, regardless of the data structure value shown.

Figure 5:
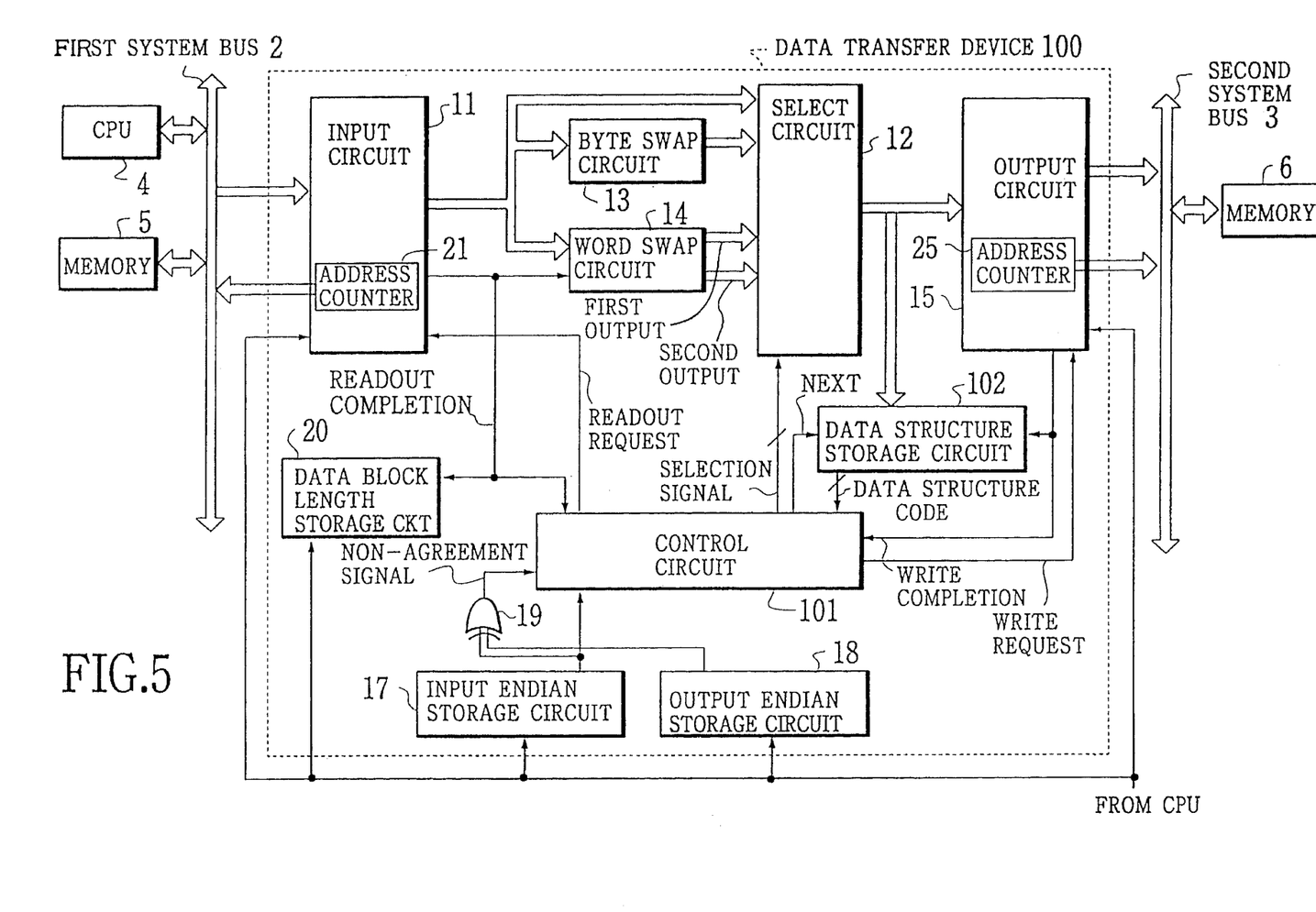
FIG. 5 is a configuration diagram illustrating a second embodiment of a data transfer device of the present invention.

FIG. 5 is a configuration diagram illustrating a second embodiment of a data transfer device 100 of the present invention.

With the above-mentioned first embodiment, the data structure control data is structured to be indicated by the CPU 4. However, this control data can be positioned in one part of the transferred data.

Figures 6A, 6B:
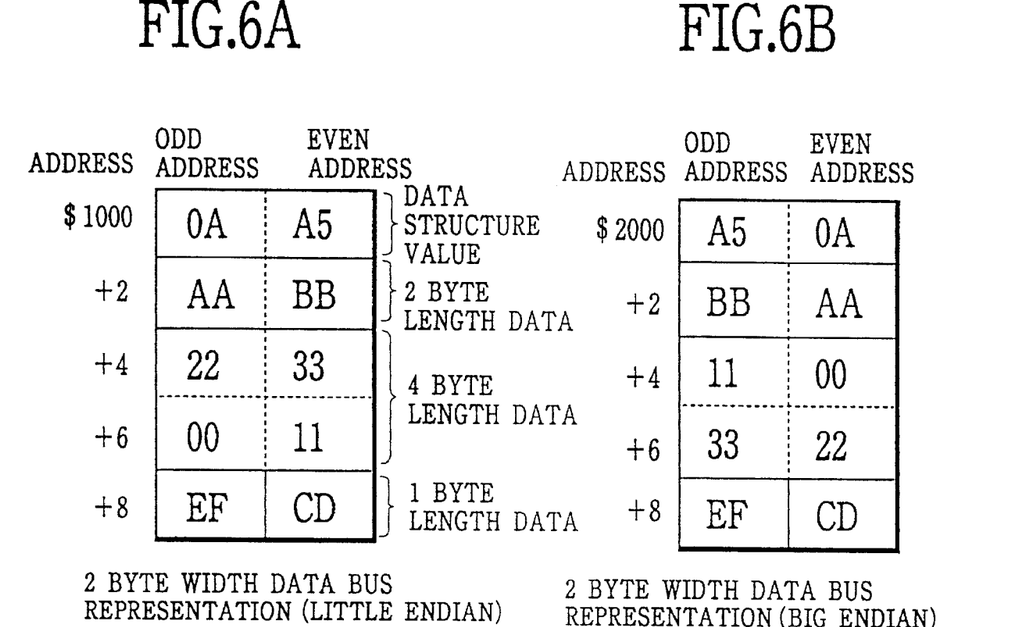
FIGS. 6A and 6B are diagrams showing one example of the data structure used in the second embodiment.

The present second embodiment will now be explained with reference to the configuration shown in FIG. 5 and data shown in FIGS. 6A and 6B.

Parts with functions identical or corresponding to parts illustrated in FIG. 2 have been assigned like reference numbers.

Further explanation is omitted here.

A data structure storage circuit 102 is structured so that it sets the output of the selector circuit 12. The value of the selector circuit 12 is input on instructions from a control circuit 101. The control circuit 101 carries out the following operation using the first word of data transfer as control data for the data structure.

First, a request is made to the input circuit 11 to input the first word. When the input endian storage circuit 17 has a little endian format, the selector circuit 12 is instructed to select the output of the input circuit 11. On the other hand, if the format is big endian, the selector circuit 12 is instructed to select the output of the byte swap circuit 13 or word swap circuit 14.

Next, when the input circuit 11 is notified of the completion of the input of the first word, the control circuit 101 instructs the data structure storage circuit 102 to get the output from the selector circuit 12.

Because of this configuration, the first word of transferred data is set as control data for the data structure in the data structure storage circuit 102 in correct order, taking the endian format into consideration.

The selector circuit 12 is then controlled to match the output side endian, and a write request is sent to the output circuit 15 to write the control data itself for the data structure into the output side memory 6.

The operation of this embodiment will now be explained using specific data. Prior to the data transfer, the CPU 4 sets the address counter of the input circuit 11, the address counter 25 of the output circuit 15, the input endian storage circuit 17, the output endian storage circuit 18, and the data block length storage circuit 20.

The same data is transferred as in the first embodiment, but because the control data for the data structure is attached to the head data, as indicated below, the data length is increased by two bytes to become 10 bytes.

Input address: $1000

Output address: $2000

Input endian: Little endian

Output endian: Big endian

Data length: 10 bytes

The control circuit 101 requests the input circuit 11 to read the first word. The input circuit 11 reads the data $0AA5 which is in the address $1000. Because the input endian is the little endian format, the data which is read-out is set in the data structure holding circuit 102 via the selection circuit 12 without modification. Subsequently, the first word is written into the memory 6, and, because the output endian is the big endian format, byte-swapped data is selected by the selection circuit 12 and provided to the output circuit 15.

The control circuit 101 requests a write-in to the output circuit 15 and the output of the first word is completed. The data structure storage circuit 102 stores the data structure of the second and subsequent words. The data $0AA5 comprises, in the same manner as in the first embodiment, one unit of data of a two-byte length, one unit of data of a four-byte length, and two units of data of a one-byte length.

At the point where the reading and writing of the first word is completed, the input address becomes $1002, the output address becomes $2002, and the data length becomes eight bytes. The operating conditions are the same as at the initial time period of the first embodiment.

Subsequent operations are exactly the same as for the first embodiment, therefore further explanation is omitted. This embodiment was explained for 16 bits of control data for the data structure, but control data for an even larger number of bits is also possible.

In addition, two bits were allotted for every one byte of data as control data for the data structure, but it is possible to encode one data element as indicating a size of a transfer unit. For example, when "00" indicates data of a one-byte length, "01" indicates data of a two-byte length, and "10" indicates data of a four-byte length, a 16-bit data structure value can represent eight data elements.

In this manner it is extremely easy for one skilled in the art to change the structure of the format for representing the data structure value.

Figure 7:
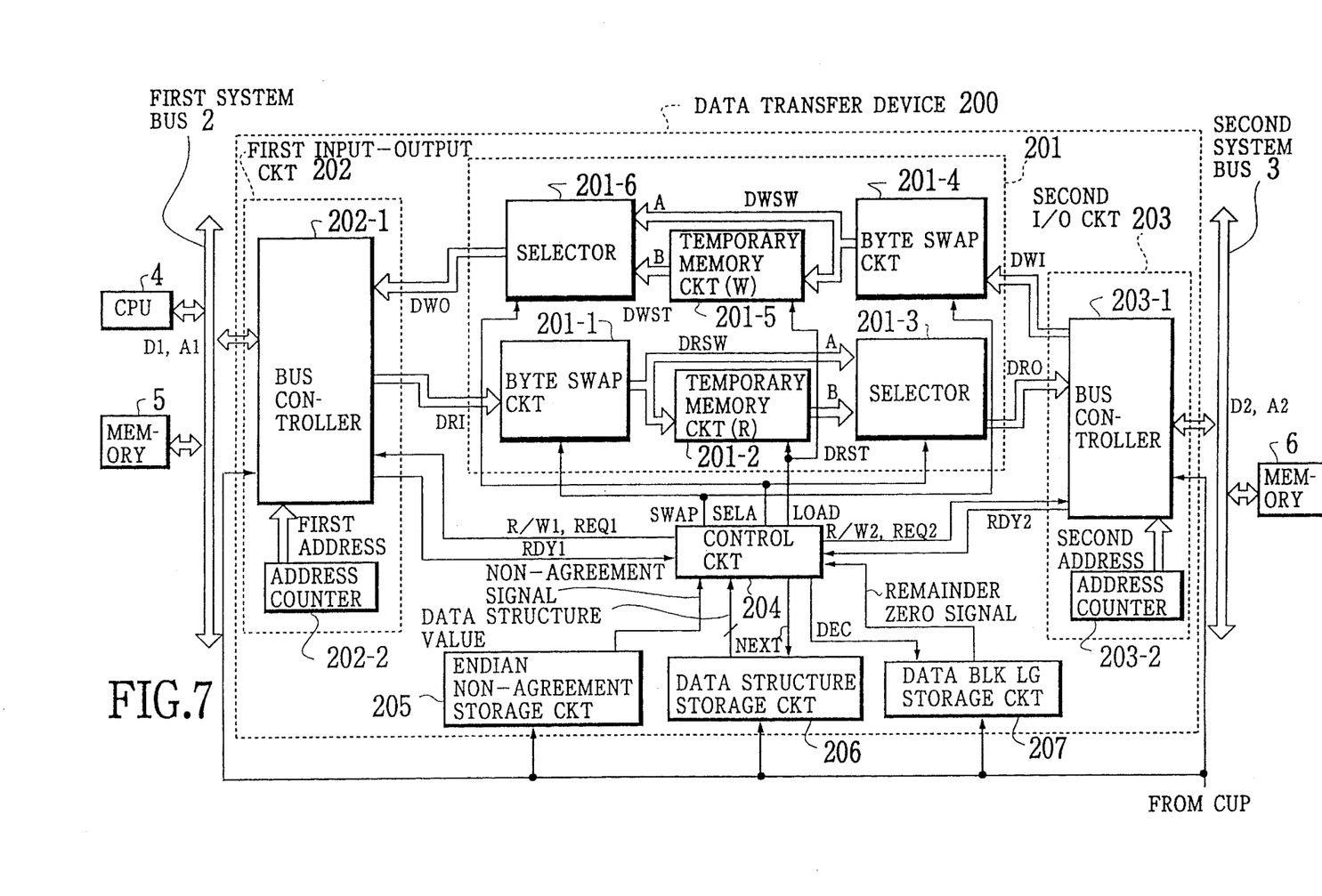
FIG. 7 is a configuration diagram illustrating a third embodiment of a data transfer device of the present invention.

FIG. 7 is a configuration diagram illustrating a third embodiment of a data transfer device 200 of the present invention.

In this third embodiment, data is transferred between the memory 5 and the memory 6 in both directions.

A first I/O circuit 202 controls a first system bus 2 and is provided with a bus controller 202-1 and an address counter 202-2, while a second I/O circuit 203 controls a second system bus 3 and is provided with a bus controller 203-1 and an address counter 203-2.

The bus controller 202-1 receives a signal R/W1 indicating a read/write mode and a signal REQ1 indicating a bus access request from a control circuit 204 and outputs an RDY1 signal indicating the completion of the memory access.

The bus controller 203-1 receives a signal R/W2 indicating a read/write mode and a signal REQ2 indicating a bus access request from a control circuit 204 and outputs an RDY2 signal indicating the completion of the memory access.

Addresses held in the respective address counters are output to address buses A1, A2 of the first and second system buses 2, 3. Data read out of data buses D1, D2 of the first and second system buses is output to buses DRI and DWI respectively, and the written data is received through buses DWO and DRO respectively, and output to the data buses D1, D2 of the first and second system buses.

The initial address for the data transfer is set in the address counters 202-2, 203-2 by the CPU4, and the counters are automatically incremented when bus access is completed.

A data structure conversion circuit 201 comprises a pair of byte swap circuits 201-1, 201-4, a pair of temporary memory circuits 201-2, 201-5, and a pair of selectors 201-3, 201-6.

The byte swap circuits 201-1, 201-4 have the function of switching upper order bytes and lower order bytes for input data of a 16-bit width. A control circuit 204 makes the switch when an output swap instruction (SWAP) signal is "1", and does not make the switch when this signal is "0".

The temporary memory circuits 201-2, 201-5 record data output by the byte swap circuits 201-1, 201-4 when an output load instruction (LOAD) signal is output by the control circuit 204. The selectors 201-3, 201-6 select an input A when an output selection instruction (SELA) signal is output by the control circuit 204, and select an input B when such a signal is not output.

An endian non-agreement storage circuit 205 is set by the CPU 4, and outputs a non-agreement signal showing that the endian formats in the first system bus and the second system bus are not equivalent.

A data structure storage circuit 206 stores the data structure for the transmitting data block. The data structure value for the read-in data (16-bit width) is output in sequence corresponding to a NEXT signal output by the control circuit 204. The data structure value is set by the CPU 4 prior to data transfer.

A data block length storage circuit 207 stores the length of the transferred data block and is decremented by the amount of the written data only as the result of a DEC signal output by the control circuit 204.

If the result is "0", a remainder zero signal is output to the control circuit 204. The control circuit 204 exercises general control over a data transfer device 200.

Figure 8:
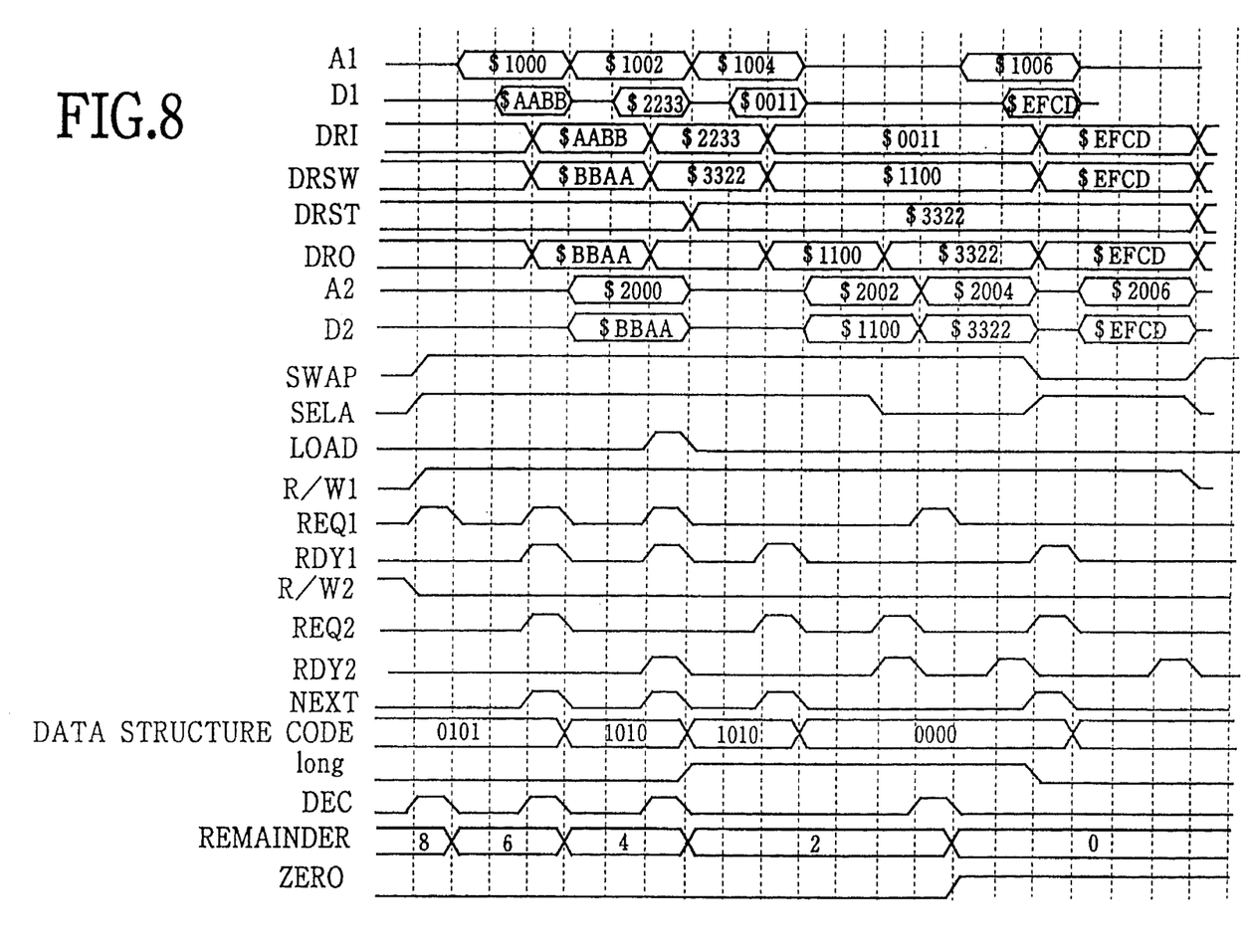
FIG. 8 is a timing chart for the third embodiment of the present invention.

The operation of the third embodiment will now be explained in detail based on a timing chart shown in FIG. 8 for the case where the endian formats of the first system bus 2 and the second system bus 3 differ.

Figure 4D:
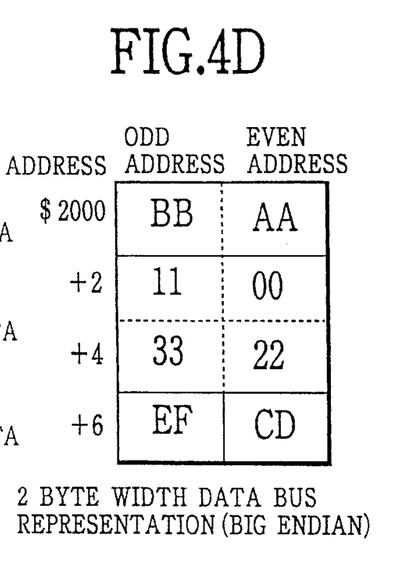
Figure 4E:
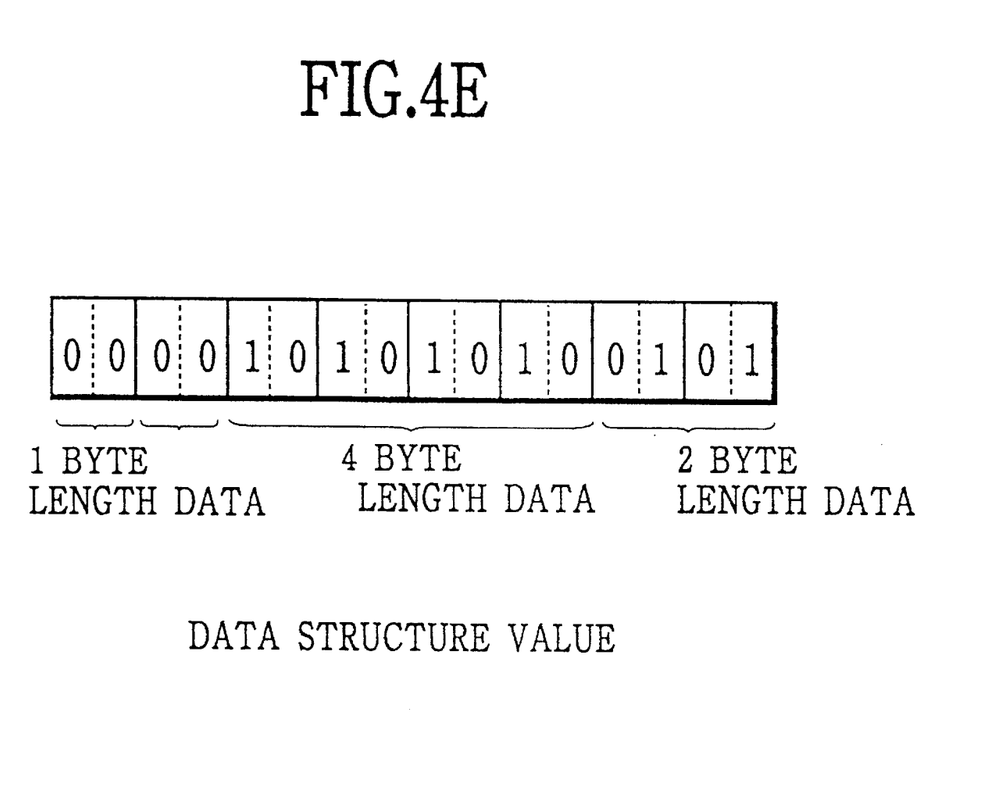

Data stored in the memory 5 is transferred to the memory 6. The data illustrated in FIG. 4B is arranged according to the address $1000. The data illustrated in FIG. 4D is written in the memory 6 from the address $1000 prior to transfer. Prior to data transfer, the CPU 4 sets the source address $1000 in the address counter 202-2, a destination address $2000 in the address counter 203-2, the number of transfer data units $8 in the data block length storage circuit 207, a data structure value $0AA5 as illustrated in FIG. 6A in the data structure storage circuit 206, and an endian non-agreement signal in the endian non-agreement storage circuit 205, respectively.

The control circuit 204 issues an instruction to start transfer. The data structure storage circuit 206 outputs B'0101' showing that the first word is data of a two-byte length. The control circuit 204 receives an endian non-agreement signal and outputs a SWAP signal.

In order to read data, a REQ1 signal is output to the bus controller 202-1. In addition, a DEC signal is transferred to the data block length storage circuit 207, an instruction is issued to input data of a two-byte length, and the remainder is decremented.

The bus controller 202-1 receives the REQ1 signal and outputs the value in the address counter 202-2 ($1000) to the first system bus 2, then reads the first word of data $AA from the memory 5. An RDY1 signal is output at the point where data is input to the bus controller 202-1, and data is output to a bus DRI.

Thereafter these operations are repeated from the input of the REQ1 signal until the output of the RDY1 signal, so further explanation is omitted.

Because a SWAP signal from the control circuit 204 is input by the bus swap circuit 201-1, the upper order byte and the lower order byte are switched and $AA is output to a bus DRSW. Because the length of the first word is two bytes, when the control circuit 204 receives the RDY1 signal, an instruction is immediately given to the bus controller 202-1 by means of the REQ1 signal to read the second word, and a NEXT signal is output to obtain the next data structure value.

Further, a request is given to the bus controller 203-1 by means of the REQ2 signal to write to the second system bus 3. Also, because the first data word is of a two-byte length, an instruction is made to the selector 201-3 to select the input A, and $AA is output to the DRO bus. The bus controller 203-1 receives the REQ2 signal and outputs the value ($2000) of the address counter 203-2 and the value in the DRO to the second system bus, and writes these values to the memory 6. The completion of the writing is advised to the control circuit 204 by the RDY2 signal. The bus controller 202-1 outputs the RDY1 signal when the reading of the second word is completed. Because at this time there is a data structure value of '1010', the control circuit 204 decides that data of a four-byte length is to be read, and modifies the inner status to "LONG".

Simultaneously, a LOAD signal is output, and a value ($3322) of the DRSW bus is input to the temporary memory circuit 201-2. Then, an instruction is issued to input the third word to the bus controller 202-1.

Because the word order must be switched and entered into the memory 6, the REQ2 signal is not output at this time.

A third RDY1 signal is output when the bus controller 202-1 has completed reading the third word. Here, the control circuit 204 outputs an SELA signal so that the data $1100 output to the DRSW bus is provided to the bus controller 203-1 and written in.

After the write-in is completed, the SELA signal becomes "0" and an instruction is issued so that the data $3322 held in the temporary memory circuit 201-2 is provided to the bus controller 203-1 and written in.

At this time the fourth word is to be read, and an REQ1 signal is output to the bus controller 202-1. A fourth RDY1 signal is output when the bus controller 202-1 has completed reading the fourth word. At this time, because the data structure value is '000', the control circuit 204 decides that data of a one-bite width has been read, the SWAP signal is halted, a SELA signal is output, and an instruction is given to the bus controller 203-1 to write the fourth word. Also, at this time, a remainder zero signal is output indicating that the reading from the first system bus 2 is completed, so that an REQ1 signal is not output. The transfer of the data block by writing into the bus controller 203-1 is completed.

Transfer from the memory 6 to the memory 5 is performed by the same procedures, therefore further explanation is omitted here.

Figure 9:
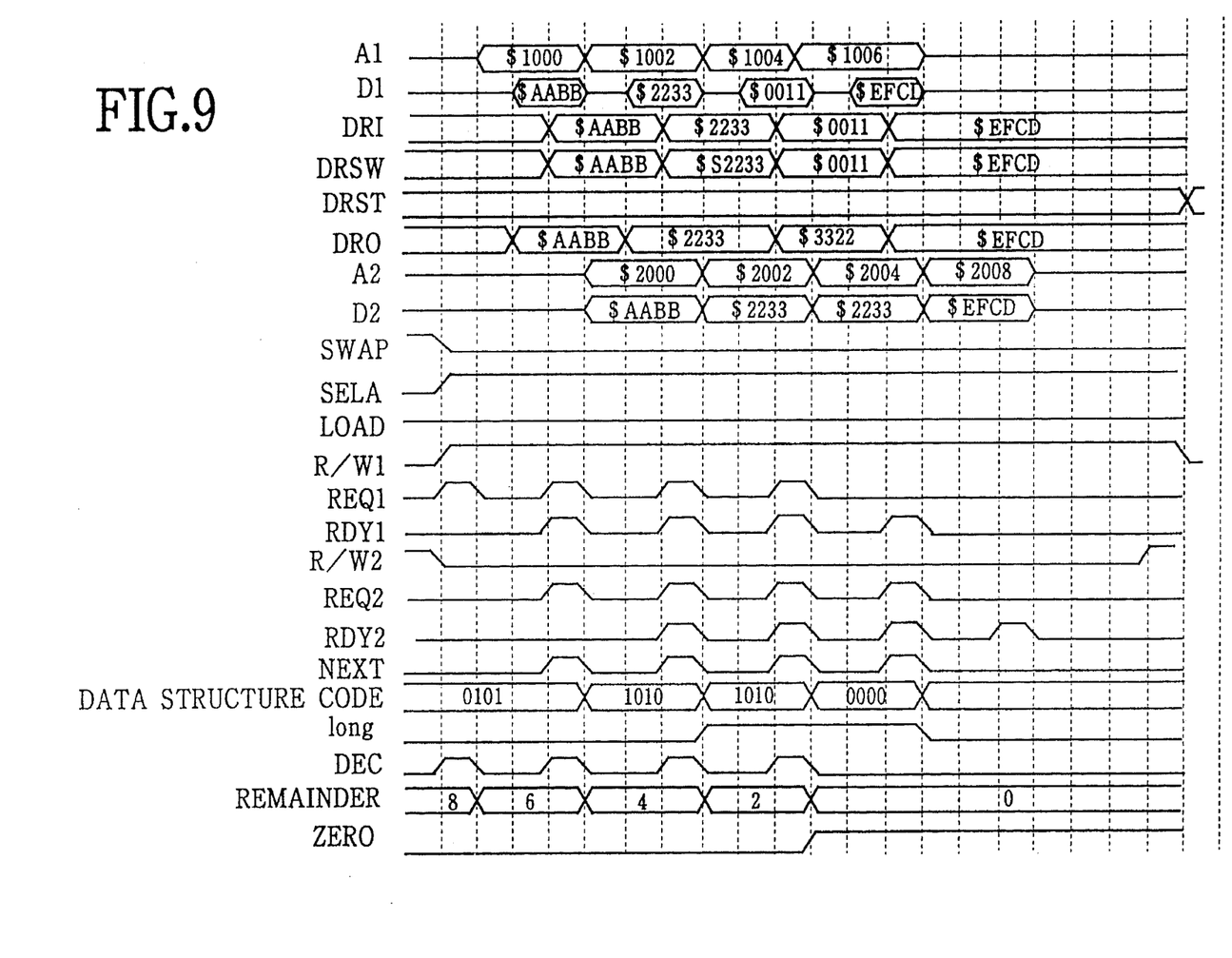
FIG. 9 is another timing chart for the third embodiment of the present invention.

The operation will now be explained in detail based on a timing chart shown in FIG. 9 for the case where the endian formats of the first system bus 2 and the second system bus 3 are the same. As in FIG. 8, data stored in the memory 5 is transferred to the memory 6. In the memory 5, the data in FIG. 4 is arranged according to the address $1000.

Because the endian formats are the same, the SWAP signal is normally "0" and does not depend on the data structure value. Also, the temporary memory circuit 201-2 is not used because it is not necessary to switch the word order with data of a four-byte length.

Accordingly, if the control circuit 204 outputs an REQ1 signal to the bus controller 202-1 and an RDY1 signal is input, it is possible to immediately output an REQ2 signal to the bus controller 202-2. The output of the REQ1 signal is repeated until a remainder zero signal is input and all the data is transferred.

In this manner, because the above-mentioned third embodiment combines the byte swap circuit, the temporary memory circuit, and the selector, a byte swap and a word swap can be easily provided without conversion.

The above-described embodiments are not restrictive of the present invention. An explanation was given for the case where data in memories on both the input side and the output side is transferred in the above embodiments, but either one or both memories may be connected to a peripheral device and the data transferred directly.

In particular, a configuration is acceptable in which the data transfer device and the peripheral device are on one LSI.

In addition, the above-mentioned embodiments were described with the input side and output side system buses independent, but these may be the same bus. Furthermore, it is acceptable to have the same memory device for read and write memories. In particular, with embodiments of this type, in a system with a CPU which uses two different endians and has a common system bus, there are the advantages of transferring data by communicating reciprocally and executing endian conversions simultaneously.

In addition, with the above-mentioned embodiments, there are three types of data, one-byte length, two-byte length, and four-byte length as object, but it is acceptable to restrict this to two types, one-byte length and two-byte length and the data structure control data may have a one-bit field per byte.

Further, 64-bit data can be added to the three types, and four columns of data can be handled.

Also, an explanation was given for the above embodiments in which the data width for the system bus is 16 bits, but the desired effect can be achieved with the same type of configuration without adhering to this, even with an 8-bit bus or a 32-bit bus.

Further, even when the width of the input system bus and the width of the output system bus differ, the desired effect can be achieved by adding a data buffer between the input circuit and the output circuit.

As explained above, by means of the present invention, data elements are assembled according to the data structure of the transmitted data, and the assembled data element is converted to the endian format of the transfer destination then transmitted.

Therefore, high speed transfer between devices with different endian formats can be achieved for data blocks made up from various data elements without endian conversion by means of program processing.

What is claimed is:

1. A data transfer device comprising:

input means for receiving a block of structured data including a plurality of data elements of different lengths from a transfer source;

conversion means for converting the structure of the received block of data elements to an endian format for a transfer destination;

output means for providing the data elements converted by said conversion means to the transfer destination;

first memory means for storing data structures associated with the data elements of the block of data;

second memory means for storing transfer source endians and transfer destination endians; and control means for controlling the conversion means according to the data structures stored first memory means, controlling the conversion means according to an endian format stored in said second memory means, and controlling the input and output of data by said input means and said output means.

2. A data transfer device as claimed in claim 1, wherein said conversion means comprises:

byte order conversion means for arranging a byte array of n-byte length data elements in reverse order for n≧2; and selection means for selecting data elements arranged by said byte order conversion means, or assembled data elements received by said input means.

3. A data transfer device as claimed in claim 1 wherein said conversion means further comprises:

a byte exchange circuit for switching the placement of one high order byte of a data element to the low order side while switching the placement of one low order byte of a data element to the high order side for a data element of two-byte length;

a word exchange circuit for switching the placement of one high order byte of a first data portion to the low order side while switching the placement of one low order byte of the first data portion to the high order side for two bytes of a first part of a data element in four-byte length, and for switching the placement of one high order byte of a second data portion to the low order side while switching the placement of one low order byte of the second data portion to the high order side for two bytes of a second part of the data element of four-byte length; and selection means for selecting the output of an assembled data element received from the input means in the case where the data element is structurally converted;

for selecting the output of a placement-switched data clement by means of the byte exchange circuit in the case where a two-byte length data element is structurally converted; and for selecting the output of the first part of the data element following the selection of the output of the second part of the data element in a placement-switched four-byte length data element by means of the word exchange circuit, in the case where a four-byte length data element is structurally converted.

4. A data transfer device as claimed in claim 1, wherein in said first memory means, a stored data structure designates the byte length of a data element assembled by said conversion means.

5. A data transfer device as claimed in claim 2, wherein in said first memory means, a stored data structure designates the byte length of a data element assembled by said conversion means.

6. A data transfer device as claimed in claim 3, wherein in said first memory means, a stored data structure designates the byte length of a data element assembled by said conversion means.

7. A data transfer device as claimed in claim 1, wherein a stored data structure is set in said first memory means by a processor.

8. A data transfer device as claimed in claim 2, wherein a stored data structure is set in said first memory means by a processor.

9. A data transfer device as claimed in claim 3, wherein a stored data structure is set in said first memory means by a processor.

10. A data transfer device as claimed in claim 4, wherein a stored data structure is set in said first memory means by a processor.

11. A data transfer device as claimed in claim 1, wherein a stored data structure is set in said first memory means by a data element received from said input means.

12. A data transfer device as claimed in claim 2 wherein a stored data structure is set in said first memory means by a data element received from said input means.

13. A data transfer device as claimed in claim 3 wherein a stored data structure is set in said first memory means by a data element received from said input means.

14. A data transfer device as claimed in claim 4 wherein a stored data structure is set in said first memory means by a data element received from said input means.

15. A data transfer device as claimed in claim 1, wherein each of said transfer source and said transfer destination is a memory.

16. A data transfer device as claimed in claim 2, wherein each of said transfer source and said transfer destination is a memory.

17. A data transfer device as claimed in claim 3, wherein each of said transfer source and said transfer destination is a memory.

18. A data transfer device as claimed in claim 4, wherein each of said transfer source and said transfer destination is a memory.

19. A data transfer device as claimed in claim 5, wherein each of said transfer source and said transfer destination is a memory.

20. A data transfer device as claimed in claim 6, wherein each of said transfer source and said transfer destination is a memory.

21. A data transfer device as claimed in claim 1, wherein each of said transfer source and said transfer destination is a processor.

22. A data transfer device as claimed in claim 2, wherein each of said transfer source and said transfer destination is a processor.

23. A data transfer device as claimed in claim 3, wherein each of said transfer source and said transfer destination is a processor.

24. A data transfer device as claimed in claim 4, wherein each of said transfer source and said transfer destination is a processor.

25. A data transfer device as claimed in claim 5, wherein each of said transfer source and said transfer destination is a processor.

26. A data transfer device as claimed in claim 6, wherein each of said transfer source and said transfer destination is a processor.

27. A data transfer device comprising:

first and second input means for receiving a block of structured data including a plurality of data elements of different lengths from first and second data storage means respectively;

conversion means for converting the structure of the received block of data elements to an endian format for an opposite side of the data storage means;

first and second output means for providing, to said first and second data storage means, data elements which have been structurally converted by said conversion means;

first memory means for storing data structures for transmitting data blocks;

second memory means for storing endians of said first and second data storage means; and control means for controlling the conversion means according to the data structures stored in said first memory means, controlling the conversion means according to an endian format stored in said second memory means, and controlling the input and output of data by said first and second input means and said first and second output means, wherein when said first data storage means is a transfer source, said second data storage means becomes a destination source, and when said second storage means is a transfer source, said first storage means becomes a destination source.

28. A data transfer device connected to an input bus and an output bus, the data transfer device comprising:

an input circuit connected to the input bus, the input circuit receiving input data elements from the input bus, the input data elements being of various lengths;

a byte swap circuit connected to an output of the input circuit;

a word swap circuit connected to the output of the input circuit;

a select circuit connected to the output of the input circuit, an output of the byte swap circuit, a first output of the word swap circuit and a second output of the word swap circuit; and an output circuit connected between the select circuit and the output bus, wherein the select circuit selects data elements from one of the input circuit, byte swap circuit and word swap circuit for transfer to the output circuit according to the following rules:
if the input bus and output bus have matching endian formats, the select circuit selects data elements from the input circuit;
if the input bus and output bus have mismatching endian formats, the select circuit selects data elements from the input circuit when the data elements have a 1-byte length, the select circuit selects swapped data elements from the byte swap circuit when the data elements have a 2-byte length, and the select circuit selects upper order swapped data elements from the first output of the word swap circuit and then selects lower order swapped data elements from the second output of the word swap circuit when the data elements have a 4-byte length.

* * * * *